T. J. STEPHENS.
PROCESS AND APPARATUS FOR BURNING GASEOUS FUEL WITH HIGH EFFICIENCY.
APPLICATION FILED JULY 11, 1919.

1,343,098.

Patented June 8, 1920.
5 SHEETS—SHEET 1.

Inventor
Thomas J. Stephens

By Knight Bro
Attorney

T. J. STEPHENS.
PROCESS AND APPARATUS FOR BURNING GASEOUS FUEL WITH HIGH EFFICIENCY.
APPLICATION FILED JULY 11, 1919.

1,343,098.

Patented June 8, 1920.
5 SHEETS—SHEET 4.

Inventor
Thomas J. Stephens

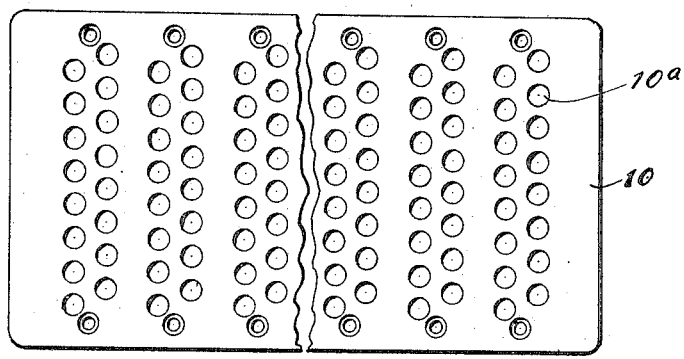
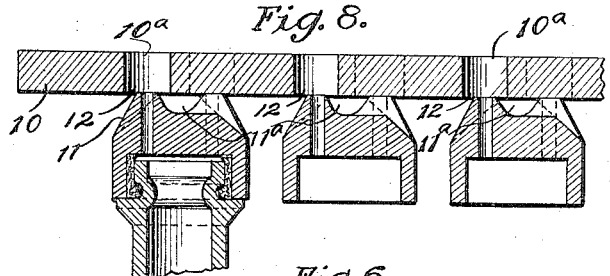
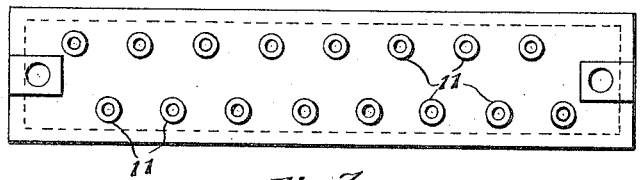
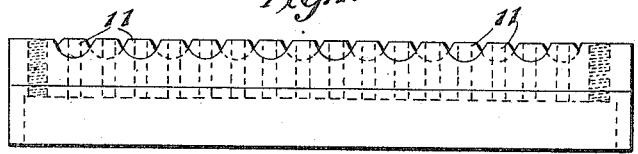

UNITED STATES PATENT OFFICE.

THOMAS J. STEPHENS, OF NEW CASTLE, PENNSYLVANIA, ASSIGNOR TO STEPHENS MANUFACTURING COMPANY, OF LOS ANGELES, CALIFORNIA, A CORPORATION OF CALIFORNIA.

PROCESS AND APPARATUS FOR BURNING GASEOUS FUEL WITH HIGH EFFICIENCY.

1,343,098.     Specification of Letters Patent.     Patented June 8, 1920.

Application filed July 11, 1919. Serial No. 310,138.

*To all whom it may concern:*

Be it known that I, THOMAS J. STEPHENS, a citizen of the United States, residing at New Castle, in the county of Lawrence and State of Pennsylvania, have invented certain new and useful Improvements in Processes and Apparatus for Burning Gaseous Fuel with High Efficiency, of which the following is a specification.

This invention relates to the production of heat for any useful purpose, by burning fuel in either fixed or locally developed gaseous form, and it has for its object to provide a method of treatment and control and means through which to insure combustion of highest efficiency per unit of fuel consumed and to utilize the heat in products of combustion in the most effective way.

The principle of combustion, so far as concerns the chemical process involved, is generally well understood to involve the union of combustible matter with an adequate proportion of oxygenating or combustion-supporting element to insure complete oxidation of the combustible portion of the fuel when the temperature of the mixture is raised to the point of ignition. But too little attention has been given to providing conditions under which the fuel and oxidizing material are brought together in approximately the correct proportions, and under which prompt and complete combustion is insured, so that the best results in heat generation are obtained. The theory upon which this invention is based is, that when fuel is burned it is desirable that only sufficient air be supplied for perfect combustion of said fuel, inasmuch as any excess quantity of air absorbs the heat generated by combustion and lowers the temperature of constituents resulting from said combustion. Further, it is obvious that the generation of heat being the object for which combustion is caused to take place, it is desirable that such heat when generated be contained within the resultant constituents in such degree as to render it capable of being transmitted to an object to be heated with the greatest degree of efficiency. Inasmuch as high efficiency in heat application depends upon high furnace temperature, that is to say, a wide range of interval between the heat containing constituents and the heat absorbing body it is important in practice of this nature that the greatest quantity of heat be contained within the smallest quantity of products of combustion. For the accomplishment of this object, I have arranged a heat generator or burner consisting of means for delivering gaseous fuel to a burner body and means for admixing air with said gaseous fuel in its passage into said burner body in quantity less than that required for complete combustion, and nozzles by which the said mixture of air and gas is injected from said burner body through admission ports to the combustion chamber of a furnace. The admission ports or flues from which ignition takes place are formed in a member constituting the lower wall or closure of the furnace.

The result of this construction, in the proper conduct of the furnace, is such that as the gas escapes from the nozzle into the burner body, air is drawn in through admission ports adjacent to the nozzle. The mixture thus formed passes through the burner body to the nozzles or burner tips, where, being discharged through the center of the admission port to the combustion chamber, its ignition takes place, and where, by reason of the draft of the furnace, air is drawn in in the form of a cylinder around the burning jet between said jet of flame and the walls of the admission port. In the proper construction of this burner, the relative sizes or capacities of the nozzle and the admission port are predetermined in the process of manufacture, and are such as to result in approximately the correct quantity of air being admitted in a cylinder about the burning jet issuing from nozzle 11 through the center of the port, to result in complete and perfect combustion.

Rising from the plate in which the flues or admission ports are formed, it is necessary that walls be provided, closing the combustion chamber from atmospheric admission, other than at the ports. It is obvious that under the conditions hereinbefore described, the quantity of air which will pass through the ports to commingle with the burning fuel in said ports and above the plate, will be affected by the difference between the pressure above the plate or within the combustion chamber, and atmospheric pressure without said combustion chamber. This condition is controlled by automatic means of regulation at the discharge of the furnace. With this construction of burner, gaseous fuel may be burned without admitting to the combustion chamber excess air in appreciable quantity, thereby developing the full quantity of heat which the said fuel is capable of producing, with the result that said quantity of heat will be contained within the smallest possible quantity of products of combustion.

Other features of the invention relate to the construction and coöperative relationship of different preferred instrumentalities utilized for realizing the principal ends to be attained, all of which will be hereinafter fully described and particularly pointed out in the claims.

In the accompanying drawings, the invention is illustrated purely by way of example, in connection with a sectional boiler for heating water and circulating it or its steam, but it is to be understood that the combustion chamber can be modified at will to render it suitable for any other useful purpose where heat is required, and where it is desired to develop such heat from the character of fuel stated, in an economical manner.

In said drawings—

Fig. 5 is a detail view of the flue plate which forms the bottom closure of the furnace; and Figs. 6, 7 and 8 are plan, side and sectional views, respectively, of the multiple tip burner, Fig. 8 also showing the flue plate in section.

Figure 1:
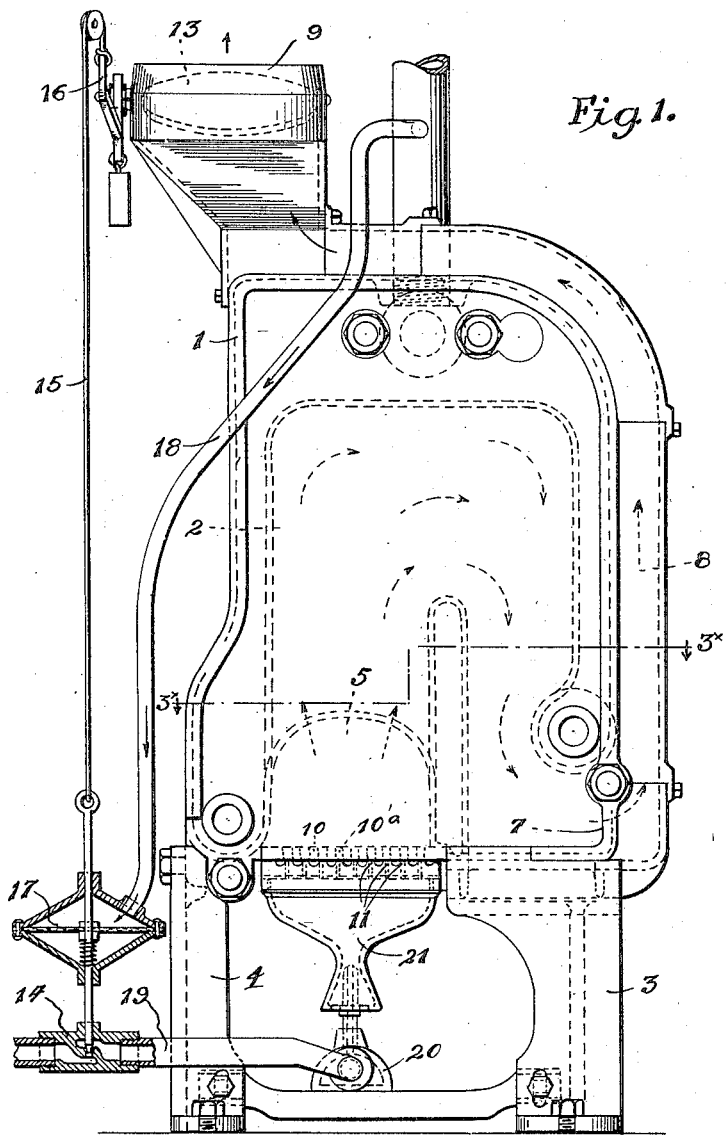
Figure 1 is an end elevation, partly in section, of a gas furnace embodying the features of the present invention and associated with a sectional water boiler.
Figure 2:
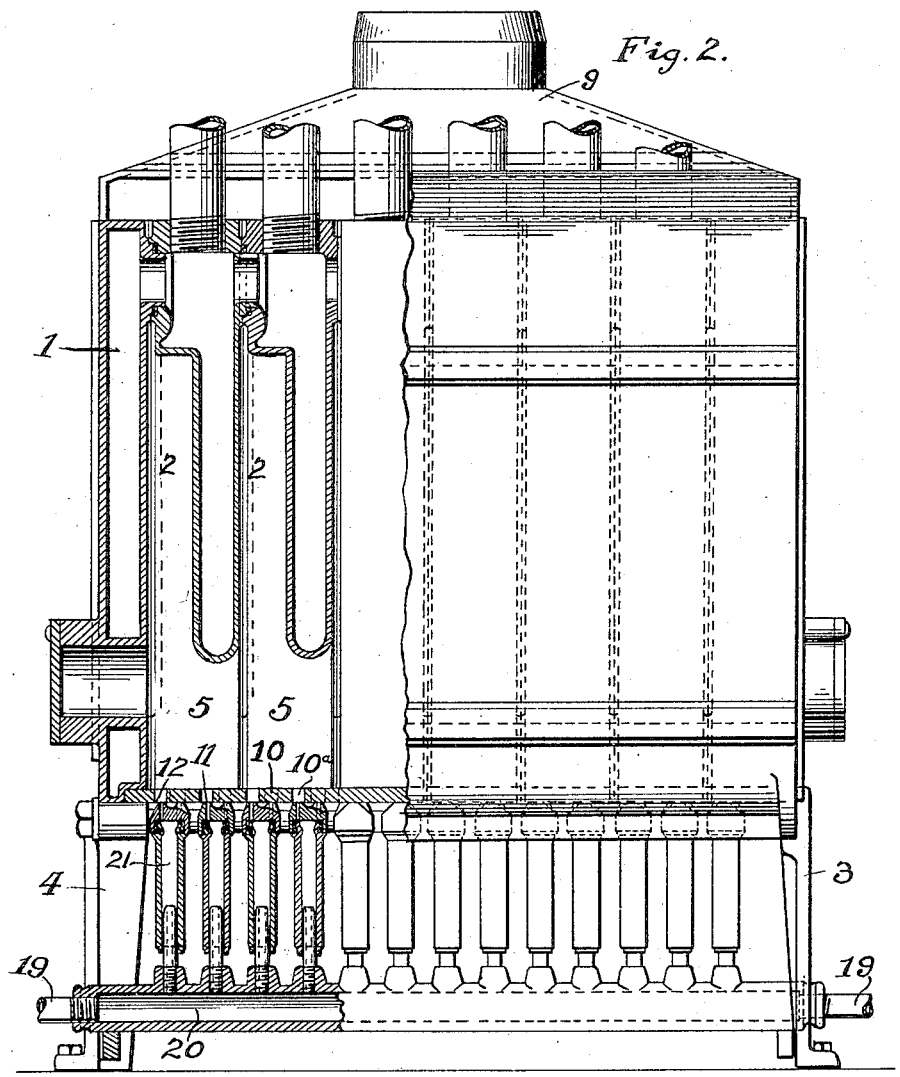
Fig. 2 is a part vertical, longitudinal section of the same.
Figure 3:
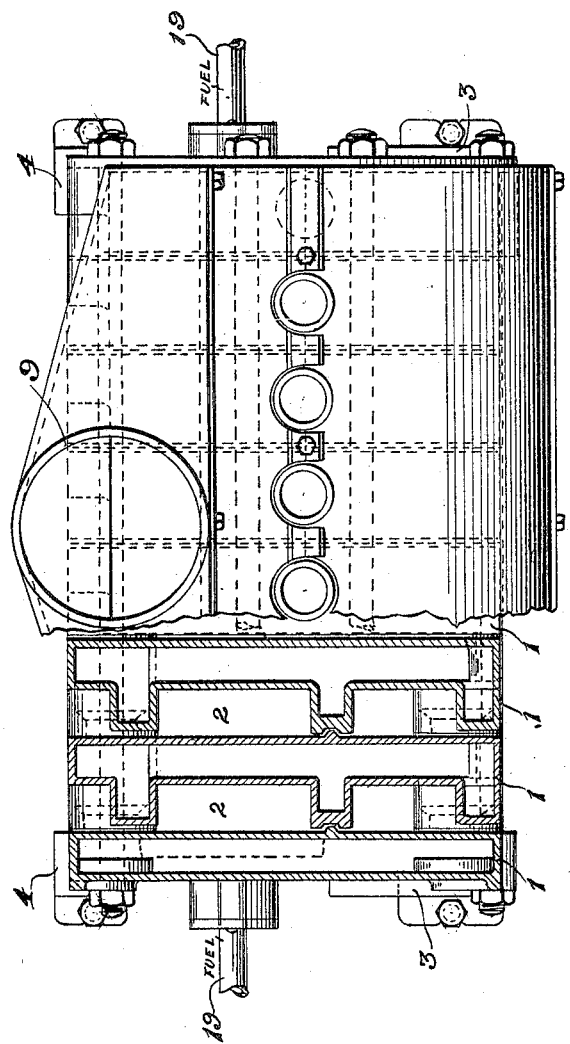
Fig. 3 is a part horizontal section of the same on the line 3ˣ—3ˣ of Fig. 1.
Figure 4:
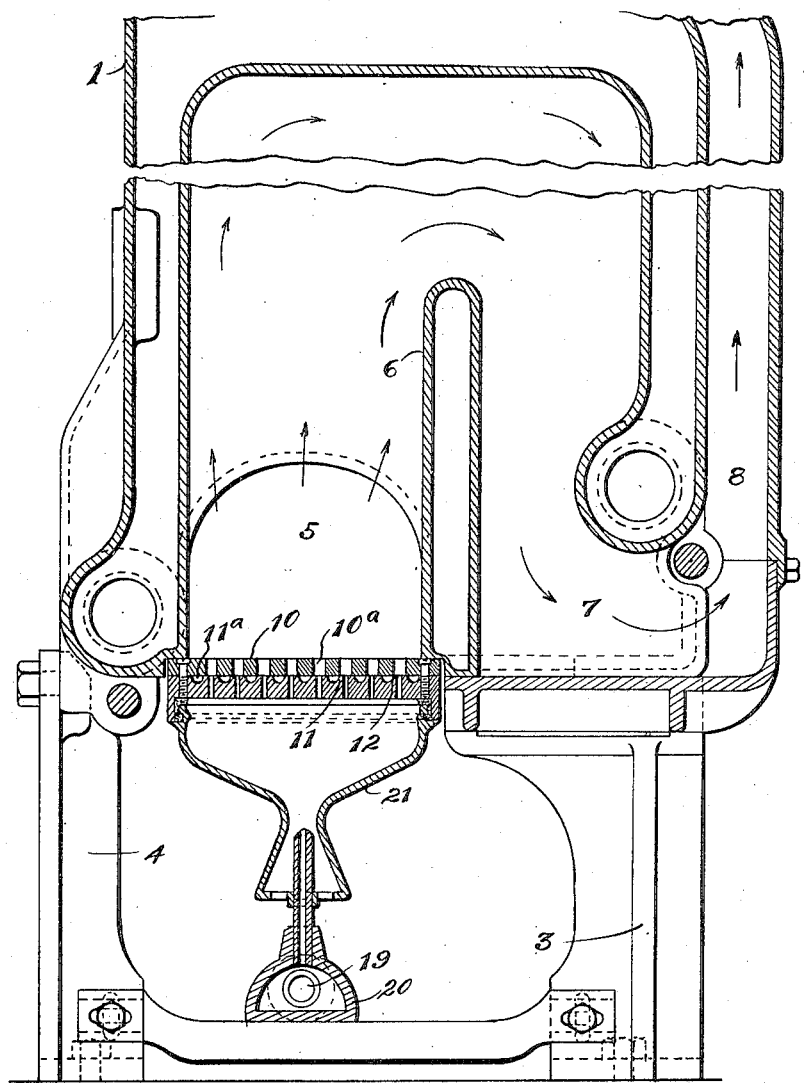
Fig. 4 is a view similar to but showing only part of Fig. 1 in section, for the purpose of disclosing the details of the burner construction.

1 represents boiler sections united in any suitable manner to provide a sectional boiler, and constructed with intervening spaces 2 adapted to serve as radiating chambers. This boiler may be suitably supported, as, for instance, by the legs 3 and 4, conveniently attached to it. To better adapt them to serve the purposes of the present invention, these sections are provided with horizontally extending arched recesses 5, alined in the several sections so as to provide a combustion chamber which may be continuous from end to end, but which communicates at top with each of the radiating chambers 2. The radiating chambers are preferably provided with baffle walls 6 to one side of and extending above the combustion chamber 5 to an extent sufficient to enforce upward flow of the hot products of combustion and thereby insure more intimate contact with the surfaces to be heated. On the remote side of the baffle wall 6 from the combustion chamber 5, and at the bottom, each radiating chamber is provided with a discharge port 7 leading into a flue 8 that overlies all of the ported lower portions of the sections and affords a common outlet for the relatively cooler products of combustion that have settled on that side of the baffle wall; this flue 8 being preferably extended upward over the outer edges of all the sections and thence across their tops, where it communicates with a stack connection 9.

It is obvious that if combustible fuel mixture were ignited without restraint and governing conditions beneath the combustion chamber 5, it would flow unrestrictedly through the radiating chamber and flue to the stack in proportion to the suction or draft that might be created, and in so doing, both incomplete combustion and uneconomical yielding of resultant heat would follow. An important feature of the present invention relates to the method of and means for effecting the fuel mixture beneath the combustion chamber 5, and providing a bottom wall or closure for said chamber which will render certain and definite the introduction of fuel both as to proportions of its ingredients and conditions under which it enters, besides insuring its thorough commingling with approximately the proportion of air yet required for insuring complete combustion; that is to say, a proportion of air which, added to that already admixed with the gaseous fuel, will be approximately the quantity required for complete combustion. The important features of the means for realizing this part of the invention comprise a flue plate 10, having formed perpendicularly through it a flue 10ᵃ for each fuel-jet to be delivered, the plate being of such thickness as will adapt it to insure thorough commingling of the gas mixture delivered by the jet with the additional quota of air that is drawn in through the port. They also comprise the burner tips 11 which terminate at the entrance of the flues 10ᵃ, in such relation thereto as to leave air intake spaces 12 surrounding the burner tips, assisted by longitudinal and transverse ducts 11ᵃ, but coacting with the transverse dimension of the flues 10ᵃ to restrict the capacity of such air intakes and insure under a given and regulated furnace draft the admission of air in quantity only sufficient to complete that required for complete combustion. Thus, the jet openings of the burner stand in such relation to the intake ports of the plate 10 that the flow of air through said ports in response to the furnace draft will develop in injector action at the jet openings, tending to draw the initial mixture from the burner end of the combustion chamber. More than this, in the preferred construction, the axial and transverse dimensions of the flues 10ª are such that these flues will be virtually filled by the fuel jets issuing from the tips 11 before said jets leave the flues, while around the lower portions of the jets are upwardly tapering air spaces to admit the air and cause it to impinge against the fuel jets. These conditions, existing simultaneously with insured commingling between the tips and the discharge ends of the flues, together with lateral confinement of the burning mixture within the flue, until complete ignition takes place, will cause the burning jets to issue from the flues and into the combustion chamber under very different conditions than where the fuel ingredients enter without such restriction and confinement, and have their ignition retarded and their temperature lowered by admission of uncontrolled quantities of air. Not only is there a material difference in combustion which takes place, but there is a totally different effect upon the flue plates, since with the described new arrangement the upper face of the plate is kept heated to sufficiently high degree to favor ignition, and its lower face radiates heat to the walls of the flues, re-acting upon the incoming jets of burning mixture. The burner 11 is supplied with its initial mixture of gaseous fuel and air by the mixing chamber 21, which receives the gaseous constituent from the manifold 20 connected through pipe 19 and the automatic valve 14 with a suitable gas supply.

For the purpose of controlling flue suction, as well as fuel mixture supply, any suitable arrangement of damper, such as shown at 13, may be provided in the flue or stack connection, while any appropriate form of gas valve, such, for instance, as the plunger valve 14, may be employed in the gas pipe 19, and in order to insure the operation of the flue damper coöperatively with the gas valve and thereby cut down the draft and consequently the air intake, proportionately to the lowering of the gas supplied, the damper and valve may have any suitable connection, such, for instance, as the flexible connection 15, 16. Then, in order to operate both of these controlling elements automatically by the work output of the furnace, these controlling elements may be adjusted by a suitable thermostatic device, if the furnace is used for some purposes, or preferably by a pressure diaphragm 17 when used in connection with a steam boiler, having a pipe 18 through which it is subjected to the boiler pressure.

Claims:

1. In a Bunsen burner, a plate having flues there-through superimposed thereon, a plate above the first-named plate having flues of greater diameter than the first-named flues there-through and adapted to register and concentric with the first-named flues, the first-named plate having air ducts therein communicating with said last-named flues.

2. In a Bunsen burner, a plate having flues there-through superimposed thereon, a plate above the first-named plate having flues of greater diameter than the first-named flues there-through and adapted to register and concentric with the first-named flues, said first-named plate having air ducts on the upper side thereof communicating with said last-named flues.

3. In a Bunsen burner, a plate having flues there-through superimposed thereon, a plate above the first-named plate having flues of greater diameter than the first-named flues there-through and adapted to register and concentric with the first-named flues, said first-named plate having air ducts on the upper side thereof communicating with said last-named flues, the top of the first-named plate and the bottom of the second-named plate being substantially in alinement.

4. A Bunsen burner having two plates superimposed thereon, the lower of said plates having flues there-through and the upper of said plates having preliminary combustion chambers therein, said flues registering and concentric with said chambers, and air intake flues between said plates.

THOMAS J. STEPHENS.